Dec. 18, 1934.  I. R. KRUG  1,984,377

TENTERING DEVICE

Filed June 10, 1933  3 Sheets-Sheet 1

INVENTOR
Ira R. Krug,
BY
Stuart Freeman,
ATTORNEY

Dec. 18, 1934.  I. R. KRUG  1,984,377
TENTERING DEVICE
Filed June 10, 1933  3 Sheets-Sheet 2

INVENTOR
Ira R. Krug,
BY J. Stuart Freeman
ATTORNEY

Dec. 18, 1934.     I. R. KRUG     1,984,377
TENTERING DEVICE
Filed June 10, 1933     3 Sheets-Sheet 3

INVENTOR,
Ira R. Krug,
BY
J. Stuart Freeman,
ATTORNEY

Patented Dec. 18, 1934

1,984,377

UNITED STATES PATENT OFFICE 1,984,377

TENTERING DEVICE

Ira R. Krug, Philadelphia, Pa., assignor of forty-five one-hundredths to C. Earl Beatty and ten one-hundredths to Mildred M. Krug, Philadelphia, Pa.

Application June 10, 1933, Serial No. 675,156

8 Claims. (Cl. 26—62)

The object of the invention is to provide improvements in tentering devices broadly, but more particularly in the perfection of constructions adapted to be employed in existing machines, by means of little or no alterations to the latter.

Further objects of the invention comprise numerous details of construction, among which are the following:—an improved design of the upper and lower plates of the link chain proper to overcome stretching; an improved arrangement of the roller and bushing in the link chain proper to relieve the pulling strain on the roller; an improved arrangement of the link arms as a part of the upper platen or plate; an improved arrangement of the control guard, to prevent the control from coming in contact with the guide and thereby picking up oil; an improved arrangement of the rear or outer roller to prevent friction on the guide at this point; an improved arrangement of the nipper fulcrum pin in the body arms to prevent wear at this point; an improved arrangement of the nipper lock for holding the nipper open to prevent non-productive wear; an improved arrangement for the detachment of the body from the link chain to provide for rapid replacement; the replacement of malleable castings with rolled steel stampings to give a uniformity in tensile strength of the link chain, and thereby reducing the weight without sacrificing strength; also the reduction of the wear upon the several links and upon the machine itself, as well as the reduction in the power consumption and shipping expense; also an improvement in the design of the bolt which connects the links together, to prevent wear between the respective bolts and the link plates, and instead distributing the wear over the entire length of the bushing and bolt in each instance; and to provide further details of construction and operation as will hereinafter fully appear in the following description, when read in conjunction with the accompanying drawings, in which Fig. 1 is a front elevational view of a construction comprising one embodiment of the invention;

Figure 1:
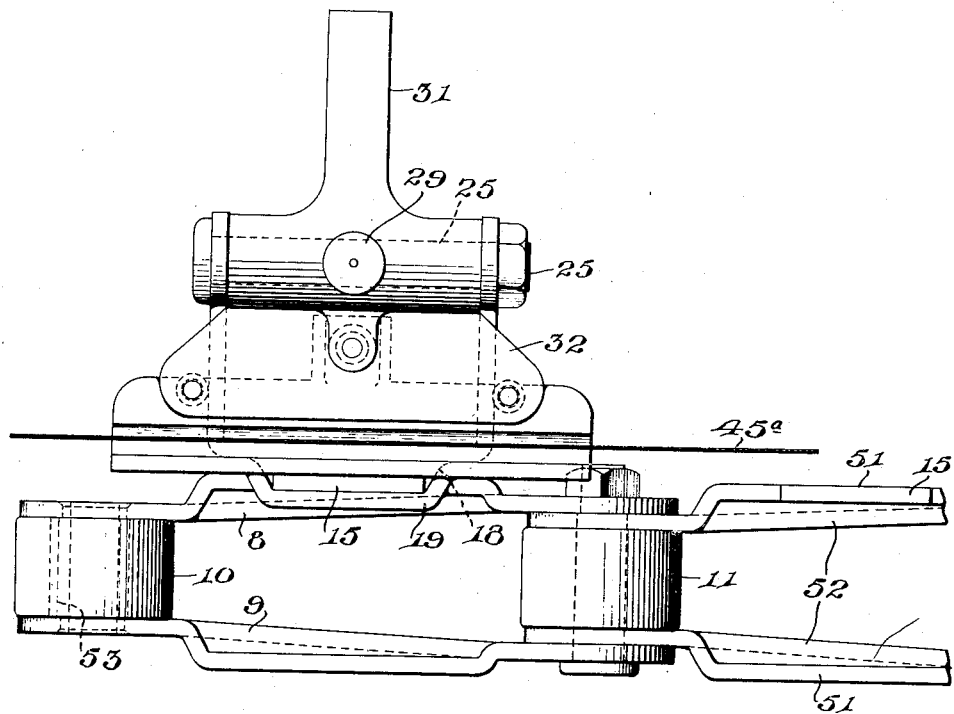
Figure 2:
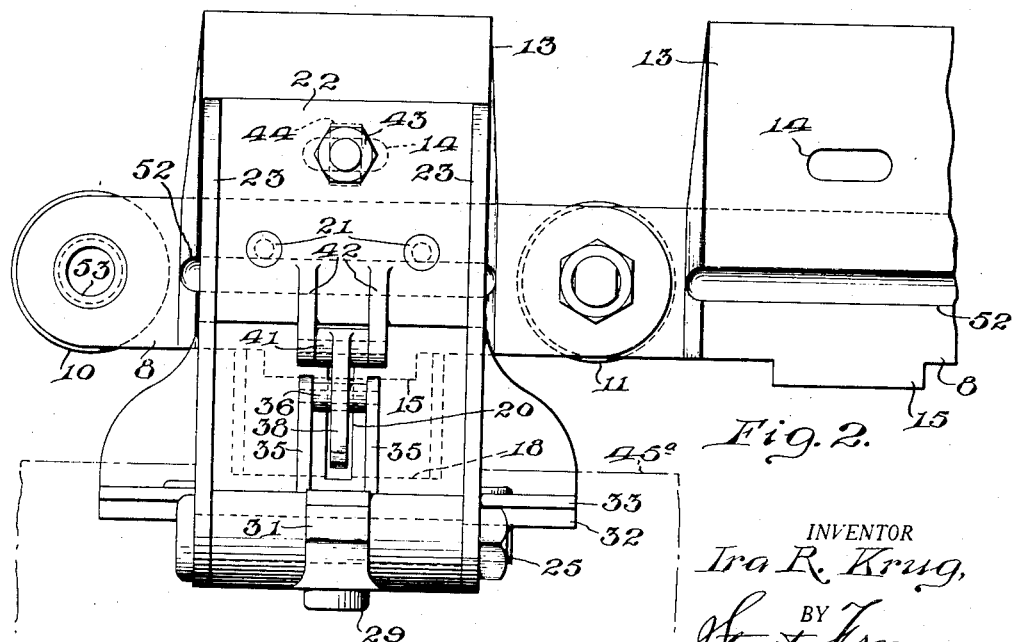
Fig. 2 is a top plan view of the same.

Referring to Figs. 1 to 5 inclusive, the particular machine with which the improved tentering device is employed, comprises a body portion 1 having a channelled recess 2, bounded upon one side by a wall 3, the upper surface 4 of which provides a track, while the opposite side of said recess is limited by an upstanding wall 5, to the upper portion of which is secured by any suitable means a plate 6, which overhangs said recess and provides upon its under side a downwardly directed track surface 7.

Figure 5:
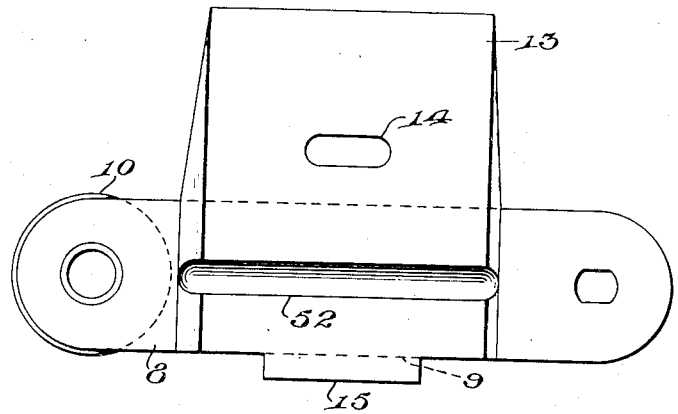
Fig. 5 is a top plan view of the link alone.

Within said recess progressively moves one of a pair of link chains, each of which comprises a series of upper and lower links 8 and 9, the adjacent forward ends of each pair of said links being spaced apart by means of rollers 10, while the rearward portions of each such pair of links are positioned upon the opposite sides of the forward ends of the succeeding pair, between which is a second roller 11, and so on rearwardly around the endless link chain. Said rollers bear against the inner surface 12 of the wall 3 of said body 1, and the upper and lower links of each pair are essentially similar, except that the former extend laterally (as shown in Fig. 5) to form a plate 13, having a longitudinally elongated aperture 14, and so arranged that the extreme lateral portion of the upper surface of said plate cooperates with the second track surface 7, hereinbefore referred to, said upper link in the opposite direction to said plate extension being provided with a relatively narrow extension 15, hereinafter again referred to.

Figure 4:
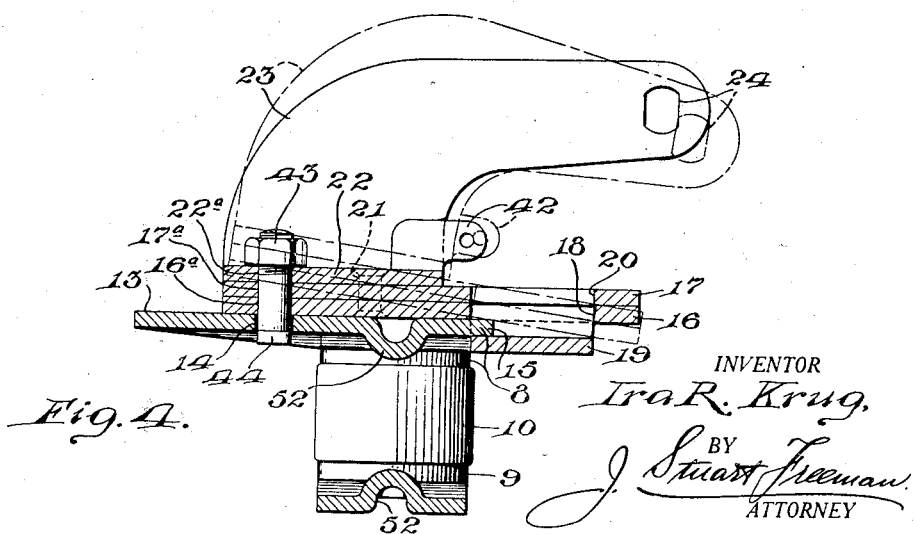
Fig. 4 is a similar view of a portion of the same, showing the nipper-supporting member both in normal (solid line) position and in tilted (dot-and-dash line) position for removal from its supporting link.

Referring particularly to Fig. 4, the nipper-supporting structure comprises a laminated base and an upwardly extending yoke. Said base comprises lower and upper plates 16 and 17, the lower plate being provided with an aperture 18, the metal from which is depressed to form a flattened stirrup 19, which normally extends below the link extension 15, and prevents said base from rising from said link, while the upper of said plates is provided with a relatively narrow aperture 20, in substantially central alignment with respect to said first aperture and for a purpose hereinafter described, the laterally opposite portions of said plates being provided respectively with apertures 16a and 17a in alignment with the aperture 14 in the link plate 13. To the rearward portion of said base is secured by rivets 21 (or in any other suitable manner), a third plate 22, which aids in securing the first two plates rigidly together, the upper (17) of said first two plates comprising the central portion of a yoke, which is provided with an aperture 22a and also comprises integral longitudinally spaced, upwardly extending, preferably parallel arms 23, said arms both being initially in the plane of said plate and struck-up so as to project freely in one lateral direction and being provided with aligned polygonally shaped apertures 24, within and between which extends a cross pin or bolt 25, having laterally and downwardly directed flattened surfaces 26 and 27, with which yieldingly cooperates selectively the spring-pressed pin 28 carried by the hollow nut 29, extending radially into the shank 30 of a nipper, from which an integral arm 31 extends substantially upwardly, and a longitudinally enlarged, depending, integral plate 32 extends normally downwardly. The forward extension of the central portion of said yoke comprises a platen across which the cloth normally passes, as hereinafter referred to.

To the link chain side of this last-named plate is secured by any suitable means a detachable plate 33 provided with a depending nipper edge 34, and centrally with a pair of spaced, laterally and downwardly directed, parallel arms 35, the free end portions of which are connected by an anti-friction roller rivet or the like 36, which also extends thru the slot 37 between the upper and lower arms 38 and 39 of a toggle member, the lower arm of which latter is provided with a depending enlargement 40 for a purpose hereinafter described, and said toggle member as a whole being pivotally mounted upon a pin 41, which extends between a pair of spaced lugs 42 integrally carried by, and extending upwardly and laterally from, the central portion of the plate 22 between the arms 23 of said yoke. Said laminated base the forward portion of which forms the platen, and said yoke are secured together and to said link plate 13 by means of a bolt 43, the normally lower head 44 of which is of substantial oblong shape, and can be readily passed thru the aligned apertures 16a, 17a and 22a and turned angularly, after which its nut is tightened, so as to tightly bind the several parts together. A reversal of this operation, that is, first loosening the nut, then slightly rotating the bolt, and finally withdrawing it longitudinally from said plate aperture 14, permits the ready separation of said yoke from its supporting link.

Figure 3:
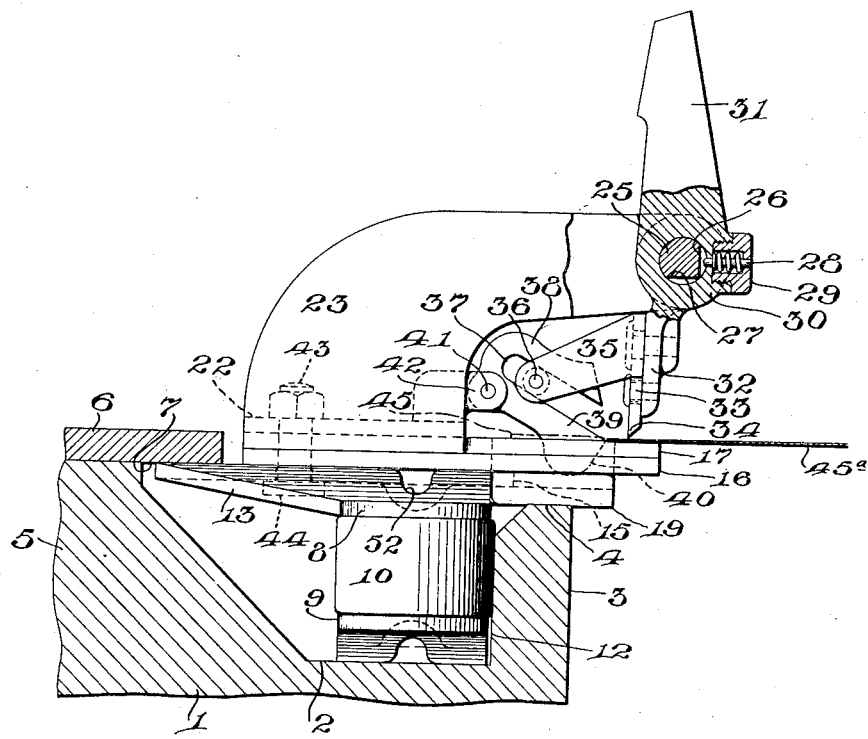
Fig. 3 is a side part elevational and part vertical sectional view of the same.

In a machine, at least one function of which is to dry textile materials, it is well known that the paths of the two spaced link chains and tentering mechanisms first receive the edge portions of the cloth, and then gradually diverge until the oppositely positioned edges of said cloth are properly positioned beneath the nippers upon the platen of the tentering devices, at which time said nippers cooperate with said platen to grip said edge portions and prevent them from shrinking towards each other, as the cloth dries or as the result of any other change in the condition thereof. Referring to Fig. 3, the dot-and-dash line 45 indicates a preliminary position of the cloth 45a upon the upper surface of the laminated base, in which position the said edge portion of the cloth supports the rounded enlarged portion 40 of the toggle hereinbefore described in raised position, with the result that the arms 35 are also in raised position and the nipper edge 34 is swung about the cross pin or bolt 25, freely above said base and out of contact with the cloth lying thereon. Then, as the cloth is gradually withdrawn from beneath said toggle, the latter drops into the recess formed by the apertures 18 and 20, and permits the nipper to automatically move into the position shown in Figs. 1, 3 and 6, where it tightly grips and binds the cloth 45a against said platen or base, the enlarged portion 40 of said toggle being shielded from oil and dirt by the stirrup 19.

Figure 6:
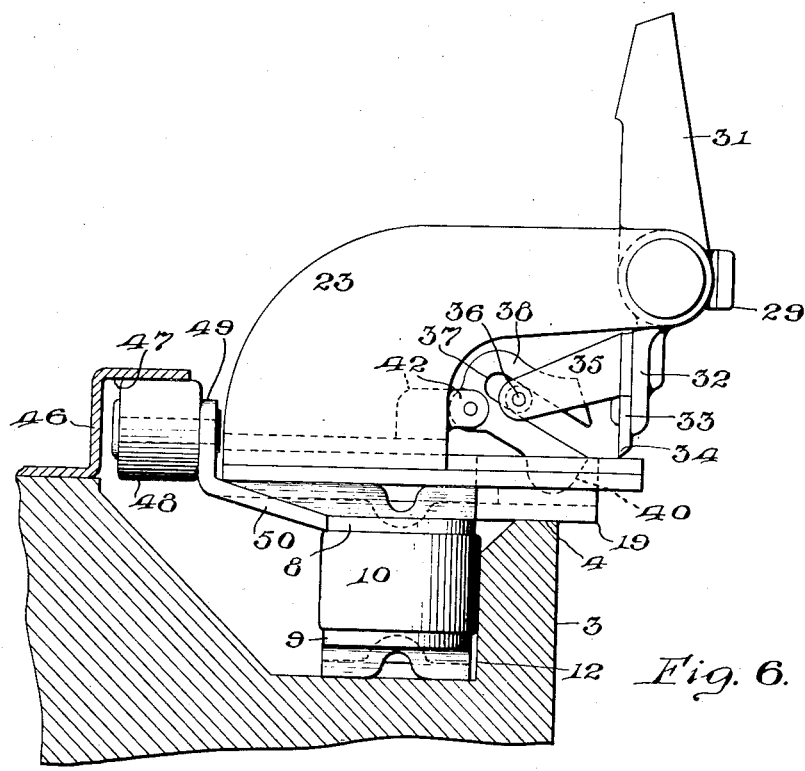
Fig. 6 is a vertical section similar to Fig. 3, but showing a modified form of the device.

Referring now to Fig. 6, it will be noted that the wall 5 is provided with a guide 46, which is of angular cross section and provides an under surface 47, forming a track for an anti-friction roller 48, rotatably carried by an angular extension 49 of the link plate 50, which corresponds in all other details to the plate 13 and its associated structure in Figs. 1 to 5.

In the design of the links 8 and 9, it will be noted that while they comprise level or parallel central portions 51 between roller-supporting end portions, which are spaced apart at materially different distances, ribs 52 of substantially circular cross section are provided, so as to prevent stretching of the links in the two endless chains. Furthermore, the end portions of said links 8 and 9 in each pair are connected by means of pins and bushings 53, around which the rollers 10 revolve, thereby placing the entire strain upon the said pins and bushings, and relieving the rollers from such strain so that their wear will be both minimized and confined to serving as a purely anti-friction means. Also, as above referred to, it will be realized that the platen base 16—17 and the plate 13 in each instance comprise integral parts of the upper link 8 of each pair, thus lessening the number of parts, minimizing weight, cost of production and assembly, as well as increasing the ultimate strength of the resulting structure. Again, the provision of two or more flattened surfaces upon the fulcrum pin 25, permits the locking pin 28 to retain said nipper in open or inoperative position when not in use, with a consequent saving in the wear between the nipper edges and the adjacent platen surface upon the upper base member 17.

I am aware that the invention may be embodied in other specific forms without departing from the spirit or essential attributes thereof, and I therefore desire the present embodiment to be considered in all respects as illustrative and not restrictive, reference being had to the accompanying claims rather than to the foregoing description to indicate the scope of the invention.

Having thus described my invention what I claim and desire to secure by Letters Patent of the United States is:—

1. In a tentering machine, the combination of a track, a chain link movable with respect to said track, a bracket secured to said link and comprising a platen and a struck-up arm, an oscillatable nipper carried by said arm, and a toggle pivotally mounted with respect to said platen and connected to said nipper, said toggle when resting upon a web lying upon said platen being operative to maintain said nipper in spaced position with respect to said platen, and when such web is withdrawn from beneath said toggle, said nipper being permitted to engage and bind such web against said platen.

2. In a tentering machine, the combination of a track, a chain link movable with respect to said track and comprising a lateral extension in one direction cooperating with said track to prevent tilting of said link, and a lateral extension in another direction, a base plate secured to said first extension and provided with a depressed stirrup encircling said second extension, and a nipper-supporting bracket normally secured to said base plate.

3. In a tentering machine, the combination of a track comprising two bearing surfaces, a chain link movable with respect to said track and comprising a lateral extension in one direction and relatively abbreviated extension in the opposite direction, anti-friction means carried by said first extension and cooperating with one of said bearing surfaces, a base plate secured to said link and provided with a depressed stirrup encircling said second extension, and cooperating with the other bearing surface, and a nipper-supporting bracket normally secured to said base plate.

4. In a tentering machine, the combination of a track comprising two bearing surfaces, a chain link movable with respect to said track and comprising a lateral extension in one direction cooperating with one of said surfaces, and a second lateral extension in another direction, a base plate detachably secured to said link and provided with a depressed stirrup encircling said second extension and cooperating with the other of said surfaces, and a nipper-supporting bracket normally secured to said base plate.

5. In a tentering device, the combination of a movable base member, a substantially U-shaped bracket secured to said member, said bracket comprising a pair of laterally positioned struck-up arms, and a lateral extension of a portion of said bracket between said arms forming a platen, a nipper pivotally carried by and between said arms, a gripping member detachably carried by said nipper, and a toggle also pivotally carried by said bracket and loosely connected to said nipper, and adapted to rest upon a web extending beneath said gripping member, to maintain said gripping member in inoperative position until such web is removed from beneath said toggle.

6. In a tentering device, the combination of a movable base member, a substantially U-shaped bracket secured to said member, said bracket comprising a pair of laterally extending spaced positioned struck-up arms, and a lateral extension of a portion of said bracket between said arms forming a platen, a nipper pivotally carried by and between said arms, a gripping member detachably carried by said nipper, and a toggle also pivotally carried by said bracket and loosely connected to said nipper, and carried by said bracket and loosely connected to said nipper, and adapted to rest upon a web extending beneath said gripping member, to maintain said gripping member in inoperative position until such web is removed from beneath said toggle, said bracket extension being provided with an aperture thru which said toggle is adapted to extend downwardly when unsupported by a web, and said base then protecting said toggle in its lowermost position.

7. In a tentering device, the combination of a chain link, comprising a lateral extension, a base member comprising a depressed stirrup normally encircling said extension and secured to said link at a point removed from said extension, a bracket of substantial U-shape and comprising a pair of laterally extending spaced arms and a lateral extension of a portion of said bracket forming a platen beneath the space between said arms, a nipper pivotally carried by and between said arms, a gripping member detachably carried by said nipper, and a toggle also pivotally carried by said bracket and loosely connected to said nipper and adapted to rest upon a web extending beneath said gripping member, to maintain said gripping member in inoperative position until such web is removed from beneath said toggle.

8. In a tentering device, the combination of a track, a chain link movable with respect to said track, a bracket secured to said link and comprising an intervening platen and laterally positioned struck-up arms, an oscillatable nipper carried by and between said arms, and a toggle pivotally mounted with respect to said platen and connected to said nipper, said toggle when resting upon a web lying upon said platen being operative to maintain said nipper in spaced position with respect to said platen, and when such web is withdrawn from beneath said toggle, said nipper being permitted to engage and bind such web against said platen.

IRA R. KRUG.